Inventor
Herbert J. Bodine
Wooster & Davis Attorneys

Patented Dec. 22, 1953

2,663,134

UNITED STATES PATENT OFFICE 2,663,134

CARRIER FOR MOWER ATTACHMENTS

Herbert J. Bodine, Newtown, Conn.

Application March 31, 1950, Serial No. 153,278

5 Claims. (Cl. 56—25)

This invention relates to a carrier and support for use in connecting and disconnecting mowing equipment to and from farm tractors or the like, and for use in storing such equipment when desired. As now usually carried out, connecting or disconnecting a mowing attachment to a tractor, for example, requires the labor of two or three men and consumes a prodigious amount of time, with accompanying danger from the possibility of the heavy and cumbersome attachment falling or dropping and injuring someone.

An object of this invention is to provide a support and carrier for a mowing attachment constructed and arranged to enable one man to connect or disconnect the attachment to or from a tractor or the like in a relatively few minutes without difficulty, strain or danger.

A further object is to provide a support and carrier for a mowing attachment arranged to facilitate moving the attachment into and out of a shed, barn or other shelter, and to support the attachment during storage.

Mowing attachments have cutters which extend outwardly to the side for a considerable distance when employed in cutting. Although the cutter can be raised to a more or less vertical inoperative position when attached to a tractor, if raised when detached from a tractor the cutter will overbalance and overturn the entire mowing attachment. For this reason the cutter has heretofore been left lowered when the mower is detached from the tractor and has required an unwarranted amount of ground space when stored.

A further object is to provide a carrier for a mowing attachment capable of supporting the attachment with the cutter raised as well as lowered when the mower is detached from the tractor, and thus conserve a great deal of storage space in a barn or other building.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figures 1, 2, 3:
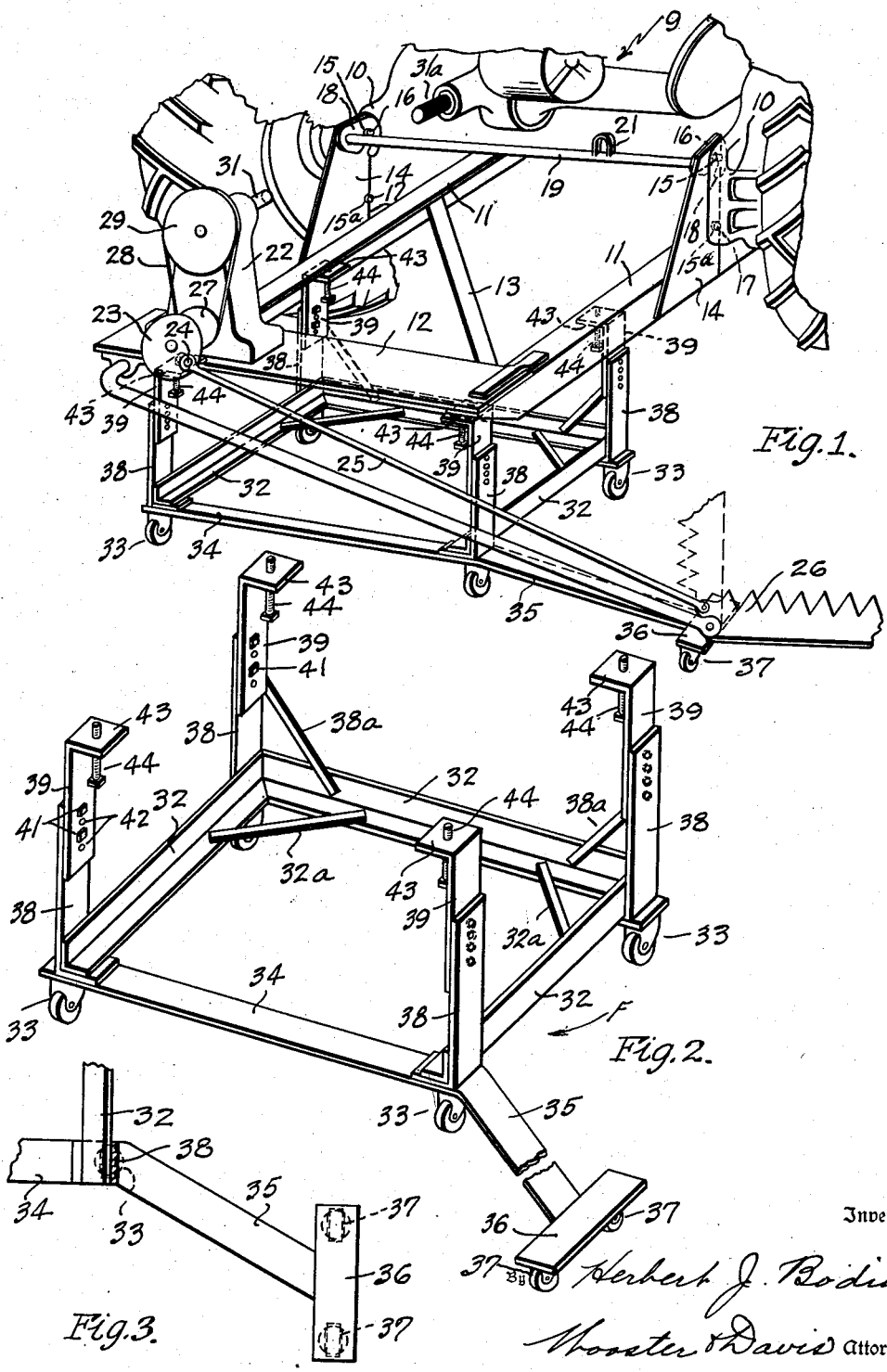
Fig. 1 is a perspective view of a carrier and support for mowing attachments constructed in accordance with one embodiment of the invention, showing it in use in connection with a mowing attachment secured to the rear end of a tractor.
Fig. 2 is a perspective view of the carrier alone on a larger scale.
Fig. 3 is a plan view of a part of the device shown in Figs. 1 and 2.

The illustrated embodiment of the invention is shown in connection with a mowing attachment mounted on the rear of a tractor 9 having side frame members 10. The mowing attachment has side angle bars 11 connected at the rear by a cross bar 12 and braced by a diagonal brace 13. Upright side plates 14 are secured on the side bars 11 and are arranged to slide in between the side frame members 10 on the tractor with a fairly close fit. Notches 15 and 15a on the inner edge of the upright side plates 14 fit over upper bolts 16 and lower bolts 17 in the side frame members 10. Retaining hooks 18 are mounted on opposite ends of a cross rod 19 rotatably supported in the upper edges of the side plates 14 and are movable by rotation of the rod 19 for engaging and disengaging the hooks 18 to and from the upper bolts 16 to thus secure the mower frame to the tractor frame. A loop 21 or the like is provided on the rod 19 for turning the rod to operate the hooks to grip or release the bolts 16, in attaching or detaching the mowing equipment to or from the tractor frame. A bearing block 22 is mounted on one end of the cross bar 12 for supporting an operating shaft 23 having an eccentric 24 connected to a pitman 25 for operating the cutters or knives 26 in the cutter bar of the mowing equipment. The eccentric 24 is driven by a pulley 27 on the eccentric shaft which is in turn driven by a belt 28 from a pulley 29 on the shaft 31 which is detachably connected when in use by a flexible coupling (not shown) to the power take-off 31a from the tractor.

The difficulty of connecting and disconnecting such mowing equipment to and from a tractor is well known. The present invention provides a carrier and support for such equipment which in the illustrated embodiment comprises a rectangular wheeled frame F formed around three sides by angle bars 32 supported on easily rotated ball bearing casters 33 or the like. Corner braces 32a can be employed if desired. The fourth side of the frame is formed by a transverse flat bar 34 having a projecting arm 35 at one end extending outwardly past the side of the frame and inclined rearwardly in a diagonal direction, as shown in Figs. 2 and 3. The arm 35 projects outwardly a substantial distance. A cutter bar supporting cross piece 36 is connected in any suitable manner to the end of the arm 35 and is mounted on ball bearing casters 37 or the like, the same as the main frame. The arm 35 and cross piece 36 thus form a cutter bar supporting outrigger.

Each corner of the frame is provided with a vertically adjustable upright comprising a lower bar or section 38 which can be braced by diagonal braces 38a, if desired, and an upper adjustable bar or section 39 connected to the lower bar or section 38 by bolts or screws 41 insertable through vertically spaced openings 42 in each bar or section. A horizontal flange 43 is formed at the top of each upper bar 39 and a vertically adjustable set screw 44 is threaded therethrough for adjustment to engage and support the side bars 11 of the mowing attachment.

In operation, assuming that the mowing attachment is to be detached from the tractor frame members 10 and stored, the adjustable uprights are first set at the proper height and secured by the bolts or screws 41. The carrier is then wheeled into position under the attachment with the uprights under the side bars 11 or the tractor is backed over the attachment, and the set screws are adjusted to engage the side bars, as illustrated in Fig. 1. After disconnecting the shaft 31 from the power take-off 31a, the cross rod 19 is rotated to lift the hooks out of engagement with the bolts 16 to detach the mowing equipment from the tractor, whereupon the entire mowing equipment supported on the carrier can be backed away from the tractor or the tractor driven forwardly away from it, as desired. The equipment is then supported entirely on the carrier and can be easily rolled to any storage point, such as a shed, barn or other place. The extension 35 and crosspiece 36 constitute a frame or outrigger for directly supporting the cutter bar mechanism 26 independently of the frame proper. As a result, the cutter bar can be raised into vertical, inoperative position, as indicated in broken lines in Fig. 1, without overbalancing the frame. This permits one man to move the equipment and store it with the cutter elevated, saving a great deal of labor as well as floor space. In again attaching the mowing attachment or equipment to the tractor, it is only necessary to reverse the above operation by rolling the equipment on the supporting carrier into position to locate the side bars 11 and plates 14 between the side frame members of the tractor, or the tractor may be backed into position if preferred, with the bolts 16, 17 in the notches 15 and 15a on the front edges of the plates 14. The bar 19 is then rotated to secure the hooks 18 to bolts 16, after which the carrier frame can be rolled away, leaving the attachment secured to the tractor and ready for use.

The invention enables one man to easily and quickly connect or disconnect the mowing attachment to a tractor or similar mechanism without having to lift the heavy equipment and without danger of its overturning or falling. When supported on the carrier it is a simple matter to roll it into and out of any suitable storage space.

Although a specific embodiment of the invention has been described in detail, it will be apparent that the invention can be variously modified and adapted within the scope of the following claims.

Having thus set forth the nature of my invention, I claim:

1. A support and carrier for a tractor mower attachment having laterally spaced substantially horizontal side bars including connecting means by which they may be connected to a farm tractor for the mower to form a part thereof and be supported and carried thereby, which connecting means are also releasable to permit disconnection of the mower from the tractor, and the mower also having a laterally extending cutter bar movable into raised inoperative position or into lowered cutting position; said support and carrier being independent of the mower attachment and the tractor and movable to a supporting position for the mower while the mower is attached to and supported by the tractor and comprising a horizontal wheeled frame, two laterally spaced pairs of spaced upright supports mounted on opposite sides of the frame and extending upwardly therefrom in positions so that each pair may be located under one of the side bars of the mower attachment, vertically adjustable side-bar engaging and supporting means on each upright above the frame movable into position to engage and support the side bars, and an outrigger frame member rigidly connected to and extending laterally from said wheeled frame and including a supporting member so positioned relatively thereto as to lie under and support said cutter bar in either raised or lowered position when said carrier is in supporting engagement with said side bars.

2. A support and carrier for a tractor mower attachment having laterally spaced substantially horizontal side bars including connecting means by which they may be connected to a farm tractor for the mower to form a part thereof and be supported and carried thereby, which connecting means are also releasable to permit disconnection of the mower from the tractor, and the mower also having a laterally extending cutter bar movable into raised inoperative position or into lowered cutting position; said support and carrier being independent of the mower attachment and the tractor and movable to a supporting position for the mower while the mower is attached to and supported by the tractor and comprising a horizontal wheeled frame, a pair of spaced vertically adjustable uprights mounted on each side of the frame and extending upwardly therefrom in position to be located under the side bars of the mower attachment, vertically adjustable side bar engaging and supporting means on each upright above the frame movable into a position to engage and support the side bars, and a wheeled outrigger frame member rigidly connected to and extending from one side of said wheeled frame and including a supporting member so positioned relatively thereto as to lie under and support said cutter bar in either raised or lowered position when said carrier is in supporting engagement with said side bars.

3. A support and carrier for a tractor mower attachment having laterally spaced substantially horizontal side bars including connecting means by which they may be connected to a farm tractor for the mower to form a part thereof and be supported and carried thereby, which connecting means are also releasable to permit disconnection of the mower from the tractor, and the mower also having a laterally extending cutter bar movable into raised inoperative position or into lowered cutting position; said support and carrier being independent of the mower attachment and the tractor and movable to a supporting position for the mower while the mower is attached to and supported by the tractor and comprising a wheeled frame, spaced vertically adjustable uprights mounted on each side of the frame and extending upwardly therefrom in position to be located under the side bars of the mower attachment, vertically adjustable engaging and supporting means for said side bars on each upright above the frame movable to a position to engage and support the side bars, said wheeled frame including a transverse frame member extending outwardly therefrom a substantial distance to provide an outrigger rigidly connected to said frame and including a supporting member located under said cutter bar so as to support said cutter bar in either raised or lowered position when said side bars are supported on said uprights.

4. A support and carrier for a tractor mower attachment having laterally spaced substantially horizontal side bars including connecting means by which they may be connected to a farm tractor for the mower to form a part thereof and be supported and carried thereby, which connecting means are also releasable to permit disconnection of the mower from the tractor, and the mower also having a laterally extending cutter bar movable into raised inoperative position or into lowered cutting position; said support and carrier being independent of the mower attachment and the tractor and movable to a supporting position for the mower while the mower is attached to and supported by the tractor and comprising a wheeled frame, vertically adjustable supporting members mounted on each side of the frame and extending upwardly therefrom in position to be located under the side bars of the mower attachment, each member including a vertically adjustable horizontal flange above the frame, a vertically adjustable side bar engaging and supporting screw member threaded through each flange on each supporting member and adjustable into supporting engagement with said side bars when the supporting members are located under them, and a wheeled outrigger frame member rigidly connected to and extending laterally from said wheeled frame and including a supporting member to be located under said cutter bar to support the cutter bar in either raised or lowered position when said screw members engage and support said side bars.

5. A support and carrier for a tractor mower attachment having laterally spaced substantially horizontal side bars including connecting means by which they may be connected to a farm tractor for the mower to form a part thereof and be supported and carried thereby, which connecting means are also releasable to permit disconnection of the mower from the tractor, and the mower also having a laterally extending cutter bar movable into raised inoperative position or into lowered cutting position; said support and carrier being independent of the mower attachment and the tractor and movable to a supporting position for the mower while the mower is attached to and supported by the tractor and comprising a wheeled frame, vertically adjustable supporting members mounted on each side of the frame and extending upwardly therefrom in position to be located under the side bars of the mower attachment, each member including a vertically adjustable horizontal flange above the frame, a vertically adjustable side bar engaging and supporting screw member threaded through each flange on each supporting member and adjustable into supporting engagement with said side bars when the supporting members are located under them, said wheeled frame including a transverse frame member extending outwardly beyond the frame at one side thereof, and a wheeled cutter bar support connected to the projecting frame member in position to be located under said cutter bar to support the cutter bar in either raised or lowered position when said screw members engage and support said side bars.

HERBERT J. BODINE.

References Cited in the file of this patent

UNITED STATES PATENTS

| Number | Name | Date |
|---|---|---|
| 386,913 | Beckert | July 31, 1888 |
| 493,811 | Beckert | Mar. 21, 1893 |
| 552,666 | Miller | Jan. 7, 1896 |
| 1,019,345 | Needham | Mar. 5, 1912 |
| 1,020,983 | Heylman | Mar. 26, 1912 |
| 1,274,499 | Beasley | Aug. 6, 1918 |
| 1,340,672 | Pruismann | May 18, 1920 |
| 1,508,279 | Jordan | Sept. 9, 1924 |
| 1,590,296 | Klein et al. | June 29, 1926 |
| 2,058,691 | Holsten et al. | Oct. 27, 1936 |
| 2,331,863 | Schroeppel | Oct. 12, 1943 |
| 2,479,099 | Cerney | Aug. 16, 1949 |